US008128975B2

(12) United States Patent
Huzinec et al.

(10) Patent No.: US 8,128,975 B2
(45) Date of Patent: *Mar. 6, 2012

(54) SUGAR ALCOHOL SANDED CONFECTIONARY AND PROCESS FOR MAKING SAME

(75) Inventors: Robert J. Huzinec, Hummelstown, PA (US); Thomas J. Carroll, Mechanicsburg, PA (US)

(73) Assignee: Hershey Foods Corporation, Hershey, PA (US)

( * ) Notice: Subject to any disclaimer, the term of this patent is extended or adjusted under 35 U.S.C. 154(b) by 395 days.

This patent is subject to a terminal disclaimer.

(21) Appl. No.: 11/432,054

(22) Filed: May 10, 2006

(65) Prior Publication Data

US 2006/0257551 A1   Nov. 16, 2006

Related U.S. Application Data

(60) Provisional application No. 60/679,493, filed on May 10, 2005.

(51) Int. Cl.
*A23G 4/18* (2006.01)
(52) U.S. Cl. ................................. 426/5; 426/3
(58) Field of Classification Search ........................ 426/5
See application file for complete search history.

(56) References Cited

U.S. PATENT DOCUMENTS

| 4,317,838 A * | 3/1982 | Cherukuri et al. ................. 426/5 |
| 4,940,594 A * | 7/1990 | Van Alstine ................... 426/231 |
| 4,976,972 A * | 12/1990 | Patel et al. .......................... 426/3 |
| 5,527,542 A * | 6/1996 | Serpelloni et al. ............. 424/488 |
| 2003/0026878 A1 | 2/2003 | Corriveau et al. |
| 2004/0180110 A1 | 9/2004 | Mistry |
| 2007/0275129 A1 * | 11/2007 | Pershad et al. ................. 426/104 |

OTHER PUBLICATIONS

Steagall et al. "Polyols: Beyond Sweet Taste", www.foodproductdesign.com, posted Oct. 1, 2007, p. 1-3.*
Jackson,E.B., "Section 11.10 Soft Panning" in Sugar Confectionery Manufacture, p. 254.*
Search Report dated Jul. 31, 2007.

* cited by examiner

*Primary Examiner* — Elizabeth Gwartney
(74) *Attorney, Agent, or Firm* — Scully, Scott, Murphy & Presser, P.C.

(57) ABSTRACT

A confectionary comprising a solid shaped confectionary composition sanded with a sugar alcohol having a negative heat of solution and a method of mixing same. The method involves coating solid pieces of confectionary composition with a wetting syrup and sanding the wetted pieces with sugar alcohol crystals. The confectionary is characterized by intense initial cooling and flavor release.

33 Claims, No Drawings

SUGAR ALCOHOL SANDED CONFECTIONARY AND PROCESS FOR MAKING SAME

RELATED APPLICATION

The present application is claiming provisional application priority of provisional application U.S. Ser. No. 60/679,493, filed on May 10, 2005.

BACKGROUND OF THE DISCLOSURE

1. Field of the Invention

The present invention is directed to a confectionary, which provides instantaneous cooling and immediate intense sweetness and a process of making that confectionary. More particularly, the present invention is directed to a confectionary, which includes a solid whose surface is sanded with crystals of a sugar alcohol having a negative heat of solution.

2. Background of the Prior Art

One of the sweeteners employed in the manufacture of confectioneries is xylitol. Xylitol, although a non-cariogenic sweetener, leaves little unfavorable aftertaste and simulates the texture and confectionary characteristics of conventional cariogenic confectioneries. As taught in U.S. Pat. Nos. 3,899,593 and 3,914,434, xylitol not only possesses non-cariogenic properties but also has substantially the same sweetening power as conventional cariogenic-producing sugars, including sucrose. Moreover, xylitol is highly soluble in water and possesses a relatively large negative heat of solution and is thus capable of producing significant cooling effects in the mouth.

A recent development in the confectionary arts has been the development of confectionaries, which impart intense cooling flavor upon initial contact in the mouth. To effectuate this feeling compounds well known for their physiological cooling effect on the skin and the mucous membranes of the mouth have been employed in such confectionaries. A particularly favored compound in this application is menthol. Menthol and other like materials, although imparting cooling effect to the mouth, also emit very strong undesirable odor and bitter taste. This is caused by the high volatility of menthol and like additives.

The above remarks establish a need in the art for a sweetener which provides the advantages of strong sweetening effects, the absence of exposure to cariogenic agents and, most importantly, high intense cooling effect without attendant undesirable odor or flavor.

Sweetening agents are employed in confectioneries as internal components. Sweetening agents, however, have also been employed as surface additives to confectionaries. Molded jellies and pastries are often "sanded" with sugars. Sugar sanding of these confectioneries provides an attractive appearance, keep molded pieces from sticking together during production and enhance initial sweetness.

Sanding of confectioneries with sugar alcohols having a negative heat of solution, however, has not been practiced in the prior art. It is emphasized that "dusting" of confectioneries have been practiced in the art. Sanding and dusting are distinguished processes in the confectionary arts. Dusting is defined as the application of a uniform coating of fine powder particles to a surface, such as the surface of a confectionary. Sanding, by definition, consists of making fine sugar crystals that adhere to the surface of the products by moistening them beforehand using techniques known in the art, such as by utilizing dry steam, or a hot solution of gum arabic or maltodextrin, and then subsequently drying the products. Sanding, thus, involves the embedding of solid crystals below the surface of the confectionary. Whereas dusting provides a uniform height of fine particles, sanding, involving as it does random penetration of the surface, results in contact with solid particles of varying height and thus different concentration of the particles.

Another distinction between dusting and sanding is that dusted particles are far smaller, resulting in higher surface areas per unit volume than the larger particles employed in sanding. This results in shorter duration of the effect of dusted particles than sanded particles.

As stated above, sanding of certain confectionaries is known in the art, although sanding of confectioneries with sugar alcohols has not been practiced in the prior art. Although one can only speculate as to the reason for this absence in the prior art, it is believed that because sugar alcohols have a high degree of hydroscopicity, one of ordinary skill in the art would not have thought of using sugar alcohols for the purpose of sanding.

The above remarks establish the need in the art for a sanded confectionary, providing intense initial cooling accompanied by corresponding intense sweet flavor.

BRIEF SUMMARY OF THE INVENTION

A new confectionary has now been developed which provides a confectionary, which provides immediate and intense cooling and flavor effects. The confectionary of the present invention, moreover, overcomes a barrier to its use, which has discouraged its earlier development. A novel process for preparing this new confectionary has also been developed.

In accordance with the present invention a confectionary is provided. The confectionary includes a solid, which includes a confectionary composition coated with a wetting syrup and sanded with crystals of a sugar alcohol having a negative heat of solution.

In further accordance with the present invention a method is provided for preparing a sanded confectionary. In this method a solid confectionary composition is prepared by combining a sweetening agent and other conventional confectionary ingredients. A wetting syrup, which includes a tackifying agent, is applied to the solid confectionary composition. Crystals of a sugar alcohol having a negative heat of solution are applied to the wetting syrup-coated solid confectionary composition. The surface of the sanded confectionary solid is dried to produce the final sanded confectionary.

DETAILED DESCRIPTION

Confectionary compositions within the scope of the present invention include chocolate, crystalline and non-crystalline products. Non-crystalline products within the scope of the present invention include hard candies, brittle, caramel, toffee, licorice, jellies and gums. Crystalline products within the contemplation of the confectionary composition of the present invention encompass fondants and creams, fudge, nougats, marshmallows, pralines, pressed candies, e.g. tablets, marzipan and pastes and panned candies (dragées). Combinations of these products are also within the scope of confectionary compositions within the scope of the present invention. For example, chocolate-coated crystalline or non-crystalline products are confectionary compositions within the scope of the present inventions.

Chocolate, an important confectionary composition, within the contemplation of the present invention, encompasses sweet chocolate, semi-sweet chocolate, bittersweet chocolate, which, as a group are often referred to as dark chocolate, milk chocolate, buttermilk chocolate, skim milk chocolate and white chocolate and are all chocolates within the scope of the present invention. In addition, any of the aforementioned chocolates filled with nuts, fruits, rice and other fillings used in the chocolate arts are also within the scope of the present invention.

The formation of chocolate, to form a confectionary composition, is conventional in the art. For example, U.S. Pat. No. 5,464,649 in its Background of the Invention section provides a summary of methods of making chocolate confectionary compositions within the scope of the present invention. That patent and the publications mentioned in the '649 patent are incorporated herein by reference.

Turning to confectionary compositions other than chocolate, e.g. the crystalline and non-crystalline products, hard candies are a major class of confectionary compositions within the scope of the present invention and include fruit drops, pressed mints, butterscotch, lollipops, candy canes and cough drops and the like. Another major confectionary within the scope of the present invention is jellies and gums. This class of confectioneries varies from soft "chews" to quite hard and includes fruit slices, gumdrops, gummy animals, jellybeans, fruit snacks and jujubes. Of the confectionary compositions within the scope of the present invention, pressed mints and chews and chocolate are particularly useful in the formation of the sanded confectionary of the present invention.

A major component of the confectionary composition of the present invention, present in the unsanded solid component thereof, is a sweetening agent. Sweetening agents of the present invention includes cariogenic and non-cariogenic sweeteners known in the art. Thus, any of the sugars, such as sucrose, glucose (corn syrup), dextrose, invert sugar, and fructose, and mixtures thereof, may be utilized. In addition, saccharine and its various salts, such as the sodium or calcium salt; cyclamic acid and its various salts, such as the sodium salt; dipeptide sweeteners, such as aspartame and derivatives thereof, such as Neotame®; dihydrochalcone compounds, glyzrrhizin; Stevia Rebardiana (Stevioside); chloro derivatives of sucrose; dihydroflavinol; hydroxyguaiacol esters; L-amino dicarboxylic acid gem-diamines; L-aminodicarboxylic acid aminoalkenoic acid ester amides; and sugar alcohols, such as sorbitol, sorbitol syrups, mannitol, xylitol and the like may be used as the sweetening agent of the confectionary composition.

Of the sweeteners employed in the confectionary composition of the present invention, it is preferred that a non-cariogenic sweetener be utilized. Of the non-cariogenic sweeteners, sucrose or sugar alcohols are particularly desirable. Of the sugar alcohols, xylitol is particularly preferred. Xylitol is a pentahydric alcohol formed by the hydrolysis of xylan to form xylose. Xylose is reduced to xylitol by catalytic hydrogenation. Xylitol is a crystalline compound that possesses a sweetness level of about that of sucrose. Insofar as xylitol is metabolized in the body to glycogen, this alcohol is not only non-cariogenic but, in addition, may be safely consumed by those who are sugar intolerant, such as diabetics.

The solid confectionary composition of the sanded confectionary of the present invention may additionally include conventional additives. Such additives include coloring agents, such as titanium dioxide; and emulsifiers, such as lecithin and glyceryl monostearate.

A flavoring agent or agents may also be added in the confectionary composition. Useful flavoring agents may be chosen from synthetic flavoring liquids and/or liquids derived from plants, leaves, flowers, fruits, nuts and chocolate or cocoa derived flavorings or combinations thereof. Preferably, the flavoring component is selected from spearmint oil, cinnamon oil, oil of wintergreen (methyl salicylate) and peppermint oils. Also useful are artificial, natural or synthetic fruit flavors, such as citrus oil including lemon, orange, grape, lime and grapefruit, and fruit essences including apple, strawberry, cherry, pineapple and so forth. The flavors may include gelatin-based flavor capsules and/or encapsulated flavors.

The amount of flavoring agent employed is normally a matter of preference subject to such factors as flavor type, base type and strength desired. In general, flavoring agents are present in flavoring enhancing effective amounts. It is preferred that it is present in an amount of about 0.05% to about 10.0% by weight of the final confectionary composition, with amounts of about 0.1% to about 2.5% being more preferred and about 0.2% to about 2.0% being most preferred.

The confectionary composition may also include suitable auxiliary flavorings including both natural and artificial flavors, mints, such as peppermint, menthol, artificial vanilla, cinnamon, various fruit flavors, both individual and mixed, and the like. The auxiliary flavorings are generally utilized in amounts that vary depending upon the amount of the flavor delivery system employed and may, for example, range in amounts of up to about 2% by weight of the final confectionary composition weight. It is emphasized that flavorings and auxiliary flavorings may be presented in the delivery system as well as in the confectionary composition.

Colorants may also be useful in the confectionary composition of the present invention. Colorants are introduced into the confectionary composition in coloring effective amounts. It is preferred that the colorants, which include pigments, such as titanium dioxide, if present, may be incorporated into the confectionary composition in an amount of up to about 1% by weight, and more preferably, up to about 0.5% by weight. The colorants may also include dyes suitable for food, drug and cosmetic applications. The colorants are known as FD&C dyes, lakes and the like. The confectionary composition of the present invention may also include one or more odorants.

The confectionary composition solid may be in any form known in the art, such as drops, slices, animal shapes, chunks, slabs, sticks, balls, tablets and the like. The confectionary composition of the present invention is preferably a large surface solid, such as a cube or a tablet, or rectangle, such as in a chocolate bar, which is amenable to sanding.

Although the solid pieces of the confectionary composition solid may include therein a high concentration of sugar alcohol, which may be xylitol, it is still not enough, in spite of its endothermic heat of solution, to provide the desired level of instantaneous cooling and thus immediate sweetness in the mouth. This is so because a sugar alcohol, which may be xylitol, when mixed with other ingredients, is dissolved or otherwise incorporated into the composition and is not immediately available in saliva in the oral cavity. Thus, to provide the requisite cooling and immediate sweetness that is not presently provided by the confection, the confectionary composition of the instant invention is sanded with a sugar alcohol having a negative heat of solution.

Of all the commercially available sugar alcohols, xylitol has a very high sweetening level. It, moreover, has one of the highest negative heats of a solution of any sugar alcohol. It furthermore possesses a high solubility in aqueous solution including human saliva. These properties make it an excellent candidate for employment in the present invention.

Erythritol is another sugar alcohol well suited to the present invention. Erythritol has the highest negative heat of solution of any commercially available sugar alcohol thus providing an excellent cooling effect.

Although xylitol and erythritol are particularly preferred sugar alcohols for use in the present invention, xylitol, because of its greater sweetness intensity, and rate of solubility is most preferred. It is emphasized, however, that other sugar alcohols, such as sorbitol, maltitol and mannitol, as well as mixtures of these and other sugar alcohols, may also be utilized.

In order to apply the sugar alcohol, preferably xylitol and/or erythritol crystalline particles to the surface of the confectionary composition, the surface must be prepared so that the sanded particles can adhere thereto. To provide this adhesion, a wetting syrup is applied to the surface. In a preferred embodiment, the wetting syrup includes a food acceptable tackifying, and more preferably, it is present as a tackifying solution. The solution, in a preferred embodiment, includes the tackifying agent, such as Gum Arabic. The sugar alcohol is present in amounts ranging from about 40 to about 80% by weight of the wetting syrup, and more preferably from about 60 to about 70% by weight of the wetting syrup. The tackifying agent is preferably present in about 1% to about 5% by weight of the wetting syrup. More preferably, the wetting solution is a solution of a sugar alcohol and Gum Arabic. Still more preferably, the sugar alcohol is xylitol, mannitol, erythritol, maltitol or lactitol. Even still more preferably, the wetting solution sugar alcohol is maltitol. In that preferred embodiment, it is desirable that the maltitol be present in a concentration of about 66% and Gum Arabic at 1% to 5% by weight of the syrup. These percentages are by weight, based on the total weight of the wetting solution applied to the confectionary pieces. Those skilled in the art appreciate that usage rate is indicative of the amount of Gum Arabic, the tackifying agent, which adheres to the confectionary composition, rather than the amount actually present in the syrup processed.

A sugar alcohol is utilized in a preferred embodiment of the wetting syrup in order to further enhance the immediate burst of flavor and cooling provided by the sugar alcohol sanded particles. Maltitol is particularly preferred in this application because of its sweetness.

The sugar alcohol crystals are thereupon applied to the wetting syrup-coated confectionary composition solid pieces. A sufficient amount of sugar alcohol is present in the wetting syrup coated confectionary to impart a coolness sensation when bit into by a consumer. The crystals, preferably xylitol and/or erythritol, are applied such that the confectionary pieces preferably include between about 5% and about 12%. More preferably, the crystals are present in a concentration of between about 5% and about 10%. Still more preferably, the sugar alcohol sanded crystals constitute between about 6% and about 9%. These percentages are by weight based on the total weight, of the confectionary sanded pieces.

The sanded confectionary of the present invention is prepared by forming the unsanded confectionary composition, as described above, into the desired shape. Shaping, which occurs by extrusion, molding, pelleting, tabletting or other forming technique well known in the confectionary arts, occurs while the confectionary composition is in a malleable state. In a preferred embodiment, the malleable confectionary composition is extruded into a cylindrical shape or tabletted into a tubular shape.

The shaped confectionary composition is thereupon cooled into the desired solid shape and cut into the desired confectionary pieces. In a preferred embodiment, wherein the confectionary composition is cylindrically shaped, the cylindrically shaped confectionary composition is cut into cubed shaped pieces. The cut pieces, which are soft and pliable, are thereupon cured to provide the requisite texture and structure. These pieces are suitable for coating.

The pieces, which are soft and pliable, are next coated with a wetting syrup. Wet syrup coating is provided by panning, spray coating or other coating methods known in the confectionary arts. The wet syrup coated surface of the confectionary composition is thereupon subjected to sanding wherein sugar alcohol particles are applied to the wetting syrup coated surface. The sugar alcohol particles embed, at various depths, into the shaped confectionary composition pieces.

Once the solid shaped confectionary is wetted with the wetting syrup, the wetted confectionary is next sanded with dry crystals of syrups of sugar alcohol having a negative heat of solution utilizing sanding techniques known in the art. The sanding application occurs by applying sugar alcohol particles onto the wetting syrup coated surface by panning or spraying or other method known in the art for sanding.

In the most preferred embodiment, the preferred process of the present invention for applying the wetting syrup to the surface of the confection and for sanding is by coating, e.g., panning.

In the coating method, the wetting syrup is applied to a rotating mass of confections placed in a pan or belt coater using techniques known to one of ordinary skill in the art, such as for example, manually, by ladle or by automatic or semiautomatic spray coating process and the like. Preferably, the mass of confections is rotated at a speed of about 10 to about 40 rpm or about 60 to about 125 feet per minute belt speed, and more preferably between about 20 to about 25 revolutions per minute or about 80 to about 100 feet per minute belt speed. Those of ordinary skill in the confectionary art will appreciate that the selection of the rotation speed of the pan or belt speed of the belt coater is based on several factors, including but not limited to, the size and shape of the confection, the type of confection utilized and the like. Typically the pans used are stainless steel pans that are preferably either ribbed or baffled. Optionally, a sealant coat is applied as a precoat, especially if the confections contains oils or has a high acid content.

The wetting process begins by adding a small amount of wetting syrup to form a thin film on the surface of the confection. Most preferably, the amount of wetting syrup added is sufficient to cover the surface of the confection. Those of ordinary skill in the panning art will appreciate that the amount of wetting syrup added to form the thin film on the surface of the confection is dependent upon and varies with various factors, such as the type of confection used, the size and shape of the confection, and the like.

On the one hand, applying too little wetting syrup can result in a rough surface. On the other hand, applying too much wetting syrup results in the confection amassing together in the pan—a problem known as "doubling" in the art. Applying too much wetting syrup may also dissolve or melt the centers. However, one of ordinary skill in the art can determine the appropriate conditions without much difficulty.

Moreover, the selection of the syrup temperature and concentration is determined by on the desired product quality and the type of confection. The dry crystals of sugar alcohol having a negative heat of solution may be added at room temperature, although they can be added at a temperature of about 50° F. to about 90° F. Preferably, the sugar alcohol crystals that are added have an average particle size ranging from about 100 to about 500 microns and more preferably from about 110 to about 300 and even more preferably from about 140 to about 200 microns. The sugar alcohol crystals may be added by sprinkling onto the confections as the pan is rotating.

A sufficient amount of crystals of sugar alcohol having a negative heat of solution are added to provide a cooling sensation that lasts for at least thirty seconds after the consumer first chews the confection. However, it is to be noted if too much sugar alcohol crystals are added to the wetted confections, the overload of dry crystals collects in the back of the pan. As the wetted confections with the sugar alcohol crystals rotate, the sugar alcohol is absorbed and the sanded centers "wet back" i.e., become moist. Additional sugar alcohol crystals having a negative heat of solution are added until the wetting syrup coating on top of the confection becomes dry and is not capable of holding any additional crystalline coating material.

In another embodiment, the wetting and sanding steps may be repeated until a desired size is achieved. In this way, coating from 1 to about 100 layers are easily obtained preferably, the number of layers is between 1 and 10 and most preferably is one layer.

The confections thus prepared are dried. Preferably, the confections are air dried by allowing it to be laid out in a drying tray for sufficient time to dry, e.g., typically about 24 hours and allowed to dry.

The resulting confectionary has a heterogeneous coating of a sugar alcohol thereon. However, when bit into by consumers, the confectionary gives off an intense burst of cooling sensation.

The following examples are given to illustrate the present invention. Because these examples are provided for illustrative purposes, the present invention should not be deemed limited thereto.

EXAMPLE 1

Manufacture of a Spearmint Flavored Pressed Mint Composition

A sugar alcohol (sorbitol, mannitol or xylitol) (95% to 99%)[1], natural and/or artificial liquid or powdered flavors (0.25% to 3%) and a lubricant (e.g., calcium, stearate or magnesium stearate) (0.25% to 3%), are introduced, in the order recited, into mixing vessel and mixed until a homogeneous granulation is formed. The homogenous granulation is placed into a tablet press hopper and multiplicity of tablets is formed in the tablet press.

[1] Parenthesized percentages is by weight, based on the total weight of the pressed mint composition.

Each tablet confectionary comprises:
Sugar Alcohol 95% to 99% by weight
Ca or Mg Stearate 0.25% to 3% by weight
Natural and/or artificial flavor(s) 0.25% to 3% by weight.

EXAMPLE 2

Manufacture of Sanded Pressed Mints

The pressed mint tablets (200 lb.) formed in Example 3 are disposed in a motor-driven revolving open-mouthed pan. The pan is rotated at a speed of 22.5 revolutions per minute. Xylitol (5 lb.) is thereupon sprinkled over the tumbling mint tablets. A wetting syrup is then coated onto the mint tablets.

The wetting syrup is prepared by combining maltitol syrup (9.60 lb.) and Gum Arabic (0.4 lb.) by first weighing the maltitol syrup and loading it into a container provided with a mixer. A vortex is formed by the mixer. The Gum Arabic powder is slowly added and mixed with the maltitol syrup providing a syrup solids content of 66% to 67%. The resultant syrup is stored at ambient temperature (68% to 72%) to prevent recrystallization and evaporation.

The wetting syrup (3.75 lb.) is applied to the xylitol sprinkled mint tablets over a period of 30 to 60 seconds while the tablets continue to be tumbled. Tumbling continues after the application of the wetting syrup for an additional 30 to 90 seconds to permit uniform coating of the wetting syrup over the entire charge of mint tablets. Thereupon, xylitol (9.6 lb.) crystals are sprinkled over the mint tablets to sand the wetting syrup-coated tablets. This step occurs over a period of 30 to 60 seconds. Tumbling is allowed to continue for 60 to 120 seconds subsequent to xylitol addition to uniformly sand each mint tablet. After the back of the pan is checked to insure that no xylitol crystals remain in the pan, tumbling is terminated.

Unless indicated to the contrary, percentages are by weight.

The above embodiments and examples are given to illustrate the scope and spirit of the present invention. These embodiments and examples will make apparent, to those skilled in the art, other embodiments and examples. These other embodiments and examples are within the contemplation of the present invention. Therefore the present invention should be limited only by the appended claims.

What is claimed is:

1. A confectionery comprising a solid confectionery composition consisting of one layer of coating thereon, said coating comprised of a wetting syrup and sanded with crystals of a sugar alcohol having a negative heat of solution comprised of xylitol, resulting in an uneven coating of sugar alcohol on said confectionery, said sugar alcohol crystals being embedded below the surface of the confectionery and being of varying height in the coating of the confectionery, said sugar alcohol crystals being present in sufficient amounts to impart an instantaneous cooling sensation when bit into by a consumer, and said sugar alcohol crystals having an average particle size ranging from about 140 to about 200 microns.

2. A confectionery in accordance with claim 1 wherein said sugar alcohol sanding crystals are xylitol and erythritol.

3. A confectionery in accordance with claim 1 wherein said sugar alcohol sanding crystals are xylitol.

4. A confectionery in accordance with claim 1 wherein said wetting syrup includes a tackifying agent.

5. A confectionery in accordance with claim 4 wherein said tackifying agent is Gum Arabic.

6. A confectionery in accordance with claim 5 wherein said wetting syrup is a mixture of a maltitol syrup and Gum Arabic.

7. A confectionery in accordance with claim 1 wherein said confectionery composition comprises a sweetener.

8. A confectionery in accordance with claim 7 wherein said sweetener comprises a sugar alcohol.

9. A confectionery in accordance with claim 8 wherein said sweetener is xylitol.

10. A confectionery in accordance with claim 7 wherein said confectionery composition additionally comprises flavoring agents and food acceptable coloring agents.

11. A confectionery in accordance with claim 1 wherein said confectionery composition is cube or tubular-shaped or rectangular shaped.

12. A confectionery in accordance with claim 1 wherein said sanding crystals are present in an amount ranging from about 5% to about 12%, said percentages being by weight, based on the total weight of said confectionery.

13. A confectionery in accordance with claim 1 wherein said confectionery composition is a pressed mint.

14. A confectionery in accordance with claim 1 wherein said confectionery composition is a chew.

15. A confectionery in accordance with claim 1 wherein said confectionery composition is chocolate.

16. A method of making a sanded confectionery comprising:
   a) preparing a confectionery composition comprising at least one sweetening agent;
   b) forming said confectionery composition into a solid shape;
   c) coating said solid-shaped confectionery composition with a wetting syrup; and
   d) sanding said wetting syrup coated confectionery composition with crystals of a sugar alcohol having a negative heat of solution comprised of xylitol to form an uneven coating of sugar alcohol on said confectionery, wherein said sugar alcohol crystals are embedded below the surface of the confectionery and are of varying height in the coating of the confectionery, said wetting syrup sanded with sugar alcohol being applied to form one layer on top of said confectionery composition, said sugar alcohol crystals having an average particle size ranging from about 140 to about 200 microns and being present in sufficient amounts to impart an instantaneous cooling sensation when bit into by consumer.

17. A method in accordance with claim 16 wherein said wetting syrup is applied onto the surface of said solid-shaped confectionery composition by panning.

18. A method in accordance with claim 17 wherein said crystals of said sugar alcohol are applied to said wetting syrup on the surface of the solid-shaped confectionery composition by panning.

19. A method in accordance with claim 16 wherein said step (b) comprises extruding said confectionery composition in the malleable state into a cylindrical shape, cooling said cylindrically shaped confectionery composition and forming said solid cylindrically confectionery composition into a plurality of cubes.

20. A method in accordance with claim 16 wherein said step (b) comprises tabletting said confectionery composition in the malleable state into tablets.

21. A method in accordance with claim 16 wherein said step (d) comprises applying said sugar alcohol crystals onto said confectionery composition such that said crystals are present in an amount between about 5% and about 12% by weight, based on the total weight of said sanded confectionery.

22. A method in accordance with claim 16 wherein said wetting syrup is a mixture of a maltitol syrup and Gum Arabic.

23. A method in accordance with claim 16 wherein said sugar alcohol crystals are xylitol.

24. A method in accordance with claim 16 wherein said step (b) comprises extruding, molding, pelletizing, or tabletting said confectionery composition.

25. A method of preparing a solid shaped confection sanded with a sugar alcohol which comprises (a) coating an unsanded solid shaped confection with a wetting syrup comprised of a maltitol syrup and a tackifying agent, said tackifying agent being present in sufficient quantities to adhere crystals of sugar alcohol having a negative heat of solution thereto and (b) sanding said wetting syrup coating the confection with crystals of said sugar alcohol having a negative heat of solution comprised of xylitol to form an uneven coating of said sugar alcohol on said confection, said sugar alcohols crystals being embedded below the surface of the confection and being of varying height in the coating of the confectionery, said wetting syrup and sugar alcohol being applied to form one layer on top of said confection, the average crystal size of said sugar alcohol crystals ranging from about 140 microns to about 200 microns and being present in sufficient amounts to impart an instantaneous cooling sensation when bit into by consumer.

26. The method according to claim 25 wherein maltitol is present in amounts ranging from about 40 to about 80% of the wetting syrup.

27. The method according to claim 25 wherein the tackifying agent is present in amounts ranging from about 1% to about 5% by weight of the wetting syrup.

28. The method according to claim 25 wherein the tackifying agent is gum arabic.

29. The method according to claim 25 wherein said sugar alcohol is xylitol in combination with erythritol, sorbitol, maltitol, mannitol or mixtures thereof.

30. The method according to claim 29 wherein said sugar alcohol is xylitol.

31. The method according to claim 25 wherein said sugar alcohol is present in amounts ranging from about 5% to about 12% by weight of the confection.

32. The method according to claim 25 wherein said wetting syrup is applied onto the surface of said solid shaped confection composition by panning.

33. The method according to claim 25 wherein said crystals of said sugar alcohol are applied to said wetting syrup on the surface of the solid-shaped confection composition by panning or spraying.

* * * * *